United States Patent [19]
Aizawa

[11] Patent Number: 5,646,993
[45] Date of Patent: Jul. 8, 1997

[54] INFORMATION REPRODUCING METHOD AND APPARATUS HAVING PROTECT FUNCTION AND RECORDING MEDIUM USED IN APPARATUS

[75] Inventor: Takayuki Aizawa, Yokohama, Japan

[73] Assignee: Canon Kabushiki Kaisha, Tokyo, Japan

[21] Appl. No.: 384,874

[22] Filed: Feb. 7, 1995

[30] Foreign Application Priority Data

Feb. 10, 1994 [JP] Japan ..................... 6-016442

[51] Int. Cl.⁶ .......................................... H04L 9/00
[52] U.S. Cl. .................... 380/4; 380/21; 380/49; 380/50; 380/54
[58] Field of Search ................. 380/3, 4, 21, 49, 380/50, 59, 54

[56] References Cited

U.S. PATENT DOCUMENTS

| | | | |
|---|---|---|---|
| 4,785,361 | 11/1988 | Brotby | 380/4 X |
| 4,788,685 | 11/1988 | Sako et al. | 380/4 X |
| 5,371,792 | 12/1994 | Asai et al. | 380/3 |
| 5,418,852 | 5/1995 | Itami et al. | 380/4 |

*Primary Examiner*—Bernarr E. Gregory
*Attorney, Agent, or Firm*—Fitzpatrick, Cella, Harper & Scinto

[57] ABSTRACT

In reproduction of information, a decoding program is reproduced from an information recording medium on which information is enciphered and recorded, and an encryption key and the decoding program, which are used to decode the information, are recorded as well. At least one of the encryption key and the decoding program is erased in accordance with an instruction from the decoding program. It is confirmed whether at least one of the encryption key and the decoding program has been erased. Activation of the decoding program is terminated when it is confirmed that at least one of the encryption key and the decoding program has been erased.

4 Claims, 5 Drawing Sheets

INFORMATION REPRODUCING METHOD AND APPARATUS HAVING PROTECT FUNCTION AND RECORDING MEDIUM USED IN APPARATUS

BACKGROUND OF THE INVENTION

1. Field of the Invention

The present invention relates to an information reproducing method and apparatus for reproducing information from a recording medium and an information recording medium used in the apparatus.

2. Related Background Art

Various protect methods of preventing illegitimate coping operations are known in distributing information recording media such as floppy disks upon recording software or information thereon. Many of these protect methods are based on the advantages that a floppy disk drive can form a software format and generate sectors and sector addresses accompanying the sectors, and the physical addresses of a floppy disk can be directly accessed from application software. That is, many conventional protect methods are designed to inhibit access to the sectors of a floppy disk by placing the files of the floppy disk outside the control of an OS (operating system).

Recently, optical disk units and magnetooptical disk units using optical disks and magnetooptical disks as recording media have been developed. These units are expected to be widely used as external memory units for computers. For this reason, it can be said that the importance of the above protect methods of preventing illegitimate copying operations is on the increase in such optical disk and magnetooptical disk units as well.

Since sectors and sector addresses are recorded on an optical or magnetooptical disk by using embossed pits, sectors and addresses accompanying the sectors cannot be generated by an optical or magnetooptical disk unit. In addition, an optical or magnetooptical disk unit uses a SCSI interface. Since this SCSI interface supports logical addresses, an application program cannot directly access physical addresses. For this reason, a floppy disk unit is basically different from an optical or magnetooptical disk unit. Therefore, it is difficult to directly apply a protect method for a floppy disk unit to an optical or magnetooptical disk unit.

SUMMARY OF THE INVENTION

The present invention has been made in consideration of the above situation, and has as its object to provide an information reproducing method and apparatus which can reliably prevent copying of information in an optical or magnetooptical recording operation, and an information recording medium.

The above object is achieved by an information reproducing method comprising the steps:

reproducing a decoding program from an information recording medium on which information is enciphered and recorded, and an encryption key and the decoding program, which are used to decode the information, are recorded as well;

erasing at least one of the encryption key and the decoding program in accordance with an instruction from the decoding program;

confirming whether at least one of the encryption key and the decoding program has been erased; and terminating activation of the decoding program when erasure is confirmed in the step of confirming whether at least one of the encryption key and the decoding program has been erased.

In addition, the above object is achieved by an information reproducing apparatus comprising:

means for reproducing information, an encryption key, and a decoding program from an information recording medium on which the information is enciphered and recorded, and the encryption key and the decoding program, which are used to decode the information, are recorded as well;

means for decoding the information in accordance with the reproduced encryption key and decoding program; and means for erasing designated information from the information recording medium, wherein when the information is to be reproduced, an instruction to erase at least one of the encryption key and the decoding program from the information recording medium is output to the information erasing means after the decoding program is reproduced, and when erasure is confirmed, activation of the decoding program is terminated.

Furthermore, the above object is achieved by an information recording medium comprising:

an information recording/reproducing section capable of a reprogramming operation; and a ROM section incapable of a reprogramming operation, wherein enciphered information is recorded on the information recording/reproducing section, and at least one of an encryption key and a decoding program which are used to decode the information is recorded on the ROM section.

Moreover, the above object is achieved by an information recording medium comprising:

an information reproducing unit whose entire surface is constituted by a ROM section incapable of a reprogramming operation, wherein enciphered information is recorded on the information reproducing unit, together with an encryption key and a decoding program which are used to decode the information.

DETAILED DESCRIPTION OF THE PREFERRED EMBODIMENTS

Embodiments of the present invention will be described in detail below with reference to the accompanying drawings.

Figure 1:
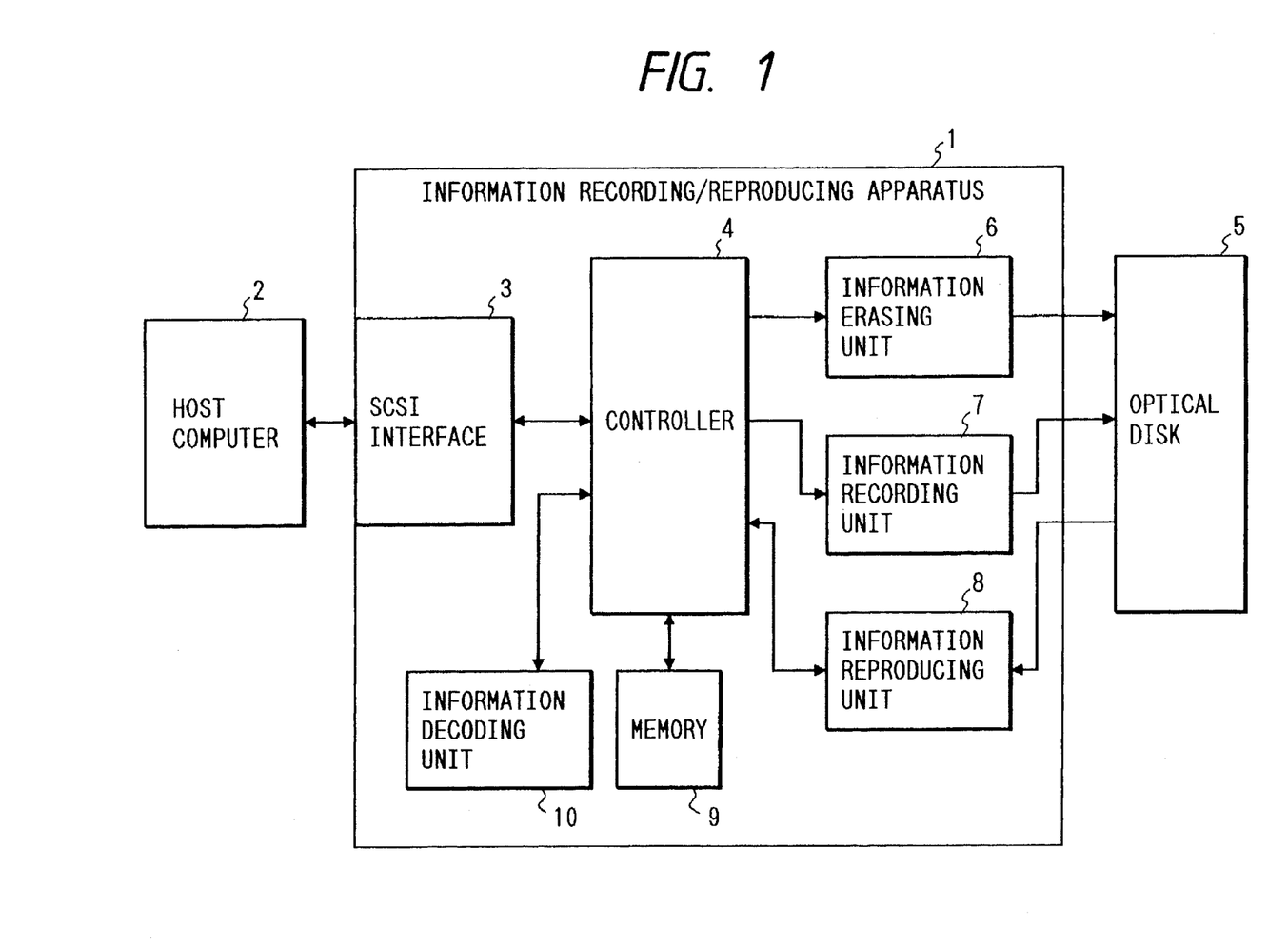
FIG. 1 is a block diagram showing an information reproducing apparatus according to an embodiment of the present invention.

FIG. 1 is a block diagram showing an embodiment of the present invention. Note that FIG. 1 shows an optical disk unit as an information recording/reproducing apparatus, which uses an optical disk as a recording medium. Referring to FIG. 1, this embodiment includes an information recording/reproducing apparatus 1 having a copy preventing function and a host computer 2 as an upper control unit. The information recording/reproducing apparatus 1 is connected, as an external memory unit, to the host computer 2. The information recording/reproducing apparatus 1 performs information recording and reproducing operations in accordance with instructions from the host computer 2. The host computer 2 and the information recording/reproducing apparatus 1 are connected to each other via a SCSI interface 3.

A controller 4 controls the respective units in the information recording/reproducing apparatus 1. An optical disk 5 serves as an information recording medium. As will be described in detail later, a so-called partial ROM is used as the optical disk 5, which has an information recording/reproducing section capable of a reprogramming operation, and a ROM (Read Only Memory) unit which cannot perform a reprogramming operation. An information erasing unit 6 erases information from the optical disk 5. An information recording unit 7 serves to record information on the optical disk 5. An information reproducing unit 8 reproduces recorded information from the optical disk 5. In these units, information erasing, recording, and reproducing operations are performed in accordance with instructions from the controller 4. A memory 9 serves to store an encryption key reproduced from the optical disk 5 and a decoding program, as will be described later. An information decoding unit 10 decodes enciphered information by using an encryption key and a decoding program. Note that when the apparatus is dedicated to reproduction of information, the information recording unit 7 is not required.

Figure 2:
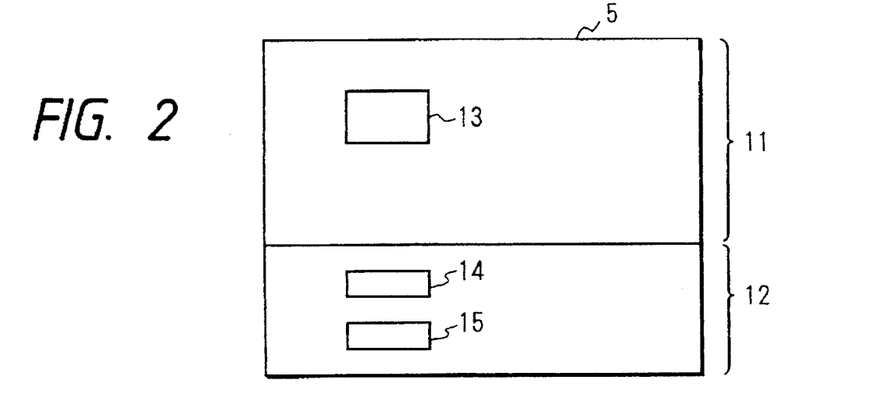
FIG. 2 is a view showing the contents of information recorded on an optical disk used in the embodiment shown in FIG. 1.

FIG. 2 shows the optical disk 5 in detail. Referring to FIG. 2, an information recording/reproducing section 11 is capable of a reprogramming operation, as described above. A ROM section 12 is incapable of a reprogramming operation, on which information is recorded by using projections/recesses such as embossed pits. The information recording medium constituted by the information recording/reproducing section 11 and the ROM section 12 in this manner is called a partial ROM, as described above. On the information recording/reproducing section 11, enciphered information 13 is recorded. An encryption key 14 used to decode the enciphered information 13 and a decoding program 15 for decoding the information are stored in the ROM section 12. That is, information to be protected against a copying operation is enciphered and recorded on the information recording/reproducing section 11, and the encryption key 14 and the decoding program 15 which are used to decode the information are stored in the ROM section 12.

Figure 3:
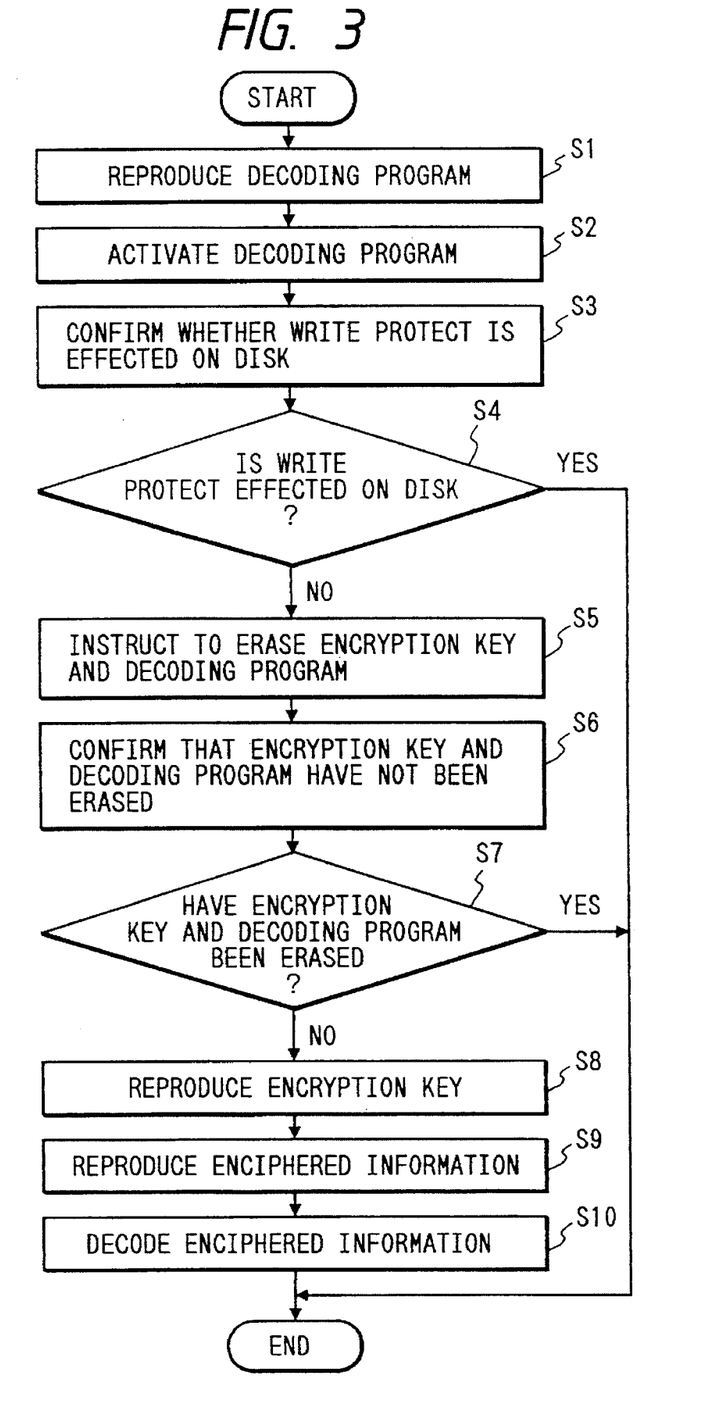
FIG. 3 is a flow chart showing an information reproducing operation in the embodiment shown in FIG. 1.

A copy preventing operation in the above embodiment will be described next with reference to FIG. 3. An operation of reading out information from the optical disk 5, on which the information is recorded as shown in FIG. 2, will be described first. Referring to FIG. 3, first of all, in reading out information, a reproduction instruction is issued from the host computer 2 to the information recording/reproducing apparatus 1 and sent to the controller 4 via the SCSI interface 3. Upon receiving the reproduction instruction, the controller 4 instructs the information reproducing unit 8 to reproduce the decoding program 15 from the ROM section 12 (step S1). The reproduced decoding program 15 is stored in the memory 9 under the control of the controller 4. The decoding program 15 is activated in the controller 4 (step S2). Subsequently, the operation of the apparatus is controlled in accordance with the decoding program 15. That is, steps S1 and S2 are associated with the operations to be performed under the control of the operating system of the host computer 2, but the operation of the apparatus in the subsequent steps is controlled in accordance with the decoding program 15.

When the decoding program 15 is activated, the controller 4 confirms whether write protect is effected on the optical disk 5 (step S3). The confirmation result is then checked (step S4). If write protect is effected on the optical disk 5, the processing is terminated because the optical disk 5 cannot erase information. If write protect is not effected on the optical disk 5, the controller 4 instructs the information erasing unit 6 to erase the encryption key 14 and the decoding program 15 recorded on the ROM section 12 (step S5). As is apparent, the erase instruction for the encryption key 14 and the decoding program 15 is programmed in the decoding program 15, and the information erasing unit 6 accesses the ROM section 12 of the optical disk 5 to erase the encryption key 14 and the decoding program 15. It is then confirmed that the encryption key 14 and the decoding program 15 have not been erased (step S6). As a result of this confirmation, it is checked whether the encryption key 14 and the decoding program 15 have been erased (step S7).

In this case, as shown in FIG. 2, since the encryption key 14 and the decoding program 15 are recorded on the ROM section 12, they are not erased, and it is determined in step S7 that the encryption key 14 and the decoding program 15 have not been erased. Therefore, the controller 4 instructs the information reproducing unit 8 to reproduce the encryption key 14 from the ROM section 12 of the optical disk 5 (step S8). The encryption key 14 is stored in the memory 9. The controller 4 then instructs the information reproducing unit 8 to reproduce the enciphered information 13 from the optical disk 5 which is designated by the host computer 2 (step S9). This reproduced information 13 is sent to the information decoding unit 10. The information decoding unit 10 decodes the enciphered information 13 by using the encryption key 14, which has already been stored in the information reproducing unit 8, in accordance with the decoding program 15 (step S10). In this manner, the enciphered information 13 is decoded. The decoded information, the encryption key 14, and the decoding program 15 are transferred from the controller 4 to the host computer 2 via the SCSI interface 3. With the above processing, reproduction of the enciphered information 13 in the optical disk 5 is completed.

Figure 4:
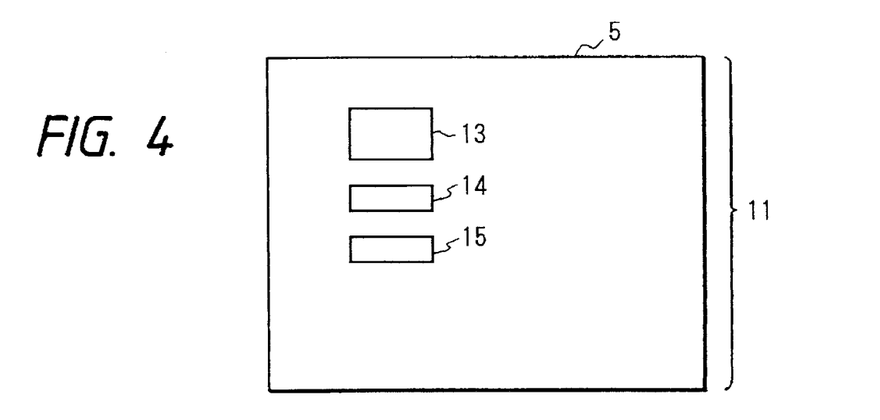
FIG. 4 is a view showing the contents obtained when the information recorded on the optical disk is recorded on another disk.

Assume that the host computer 2 transfers the information reproduced in the above manner, the encryption key, and the decoding program to the information recording/reproducing apparatus 1 or another information recording/reproducing apparatus to record them on another optical disk. FIG. 4 shows the recorded contents of another optical disk upon copying of the reproduced information onto the optical disk. In recording information, since no information can be recorded on the ROM section 12, the encryption key 14 and the decoding program 15 are recorded on the information recording/reproducing section 11.

An operation of reproducing information copied on another optical disk as shown in FIG. 4 will be described next. In this case as well, reproduction of information is performed in accordance with the flow chart shown in FIG. 3. In reproducing information, similar to the above operation, a reproduction instruction is issued from the host computer 2 to the information recording/reproducing apparatus 1. Referring to FIG. 3, upon reception of the reproduction instruction, the controller 4 reproduces the decoding program 15 (step S1) and stores it in the memory 9. Subsequently, the decoding program 15 is activated (step S2). It is confirmed whether write protect is effected on the optical disk 5 (step S3). As a result of this confirmation, it is checked whether write protect is effected on the optical disk 5 (step S4). If write protect is not effected on the optical disk 5, an erase instruction for the encryption key 14 and the decoding program 15 is output to the information erasing unit 6 (step S5).

In this case, since the encryption key 14 and the decoding program 15 are recorded on the information recording/ reproducing section 11 of the optical disk 5, as shown in FIG. 4, the encryption key 14 and the decoding program 15 are reliably erased, unlike the previous information reproduction processing. It is then confirmed that the encryption key 14 and the decoding program 15 have not been erased (step S6). As a result of the confirmation, it is checked whether the encryption key 14 and the decoding program 15 have been erased (step S7). In this case, since the encryption key 14 and the decoding program 15 have been erased, as described above, it is determined in step S7 that they have been erased. Therefore, as shown in FIG. 4, when information copied on another optical disk is to be reproduced, since the decoding program 15 is terminated upon confirmation of the erasure of the encryption key 14 and the decoding program 15, the reproducing operation is terminated without decoding the enciphered information 13.

As described above, in this embodiment, information to be protected against a copying operation is enciphered and recorded on the information recording/reproducing section, and the encryption key and the decoding program, which are used to decode the enciphered information, are recorded on the ROM section. When the information is to be reproduced, the decoding program is reproduced, and the information erasing unit is instructed to erase the encryption key and the decoding program. If the encryption key or the decoding program is erased, the decoding program is terminated. With this operation, if the information in the optical disk has been copied on another disk, the encryption key and the decoding program are erased, and the decoding program is terminated. Therefore, decoding of the enciphered information is substantially impossible, and copying of the information recorded on the optical disk can be effectively prevented.

In the information reproducing operation in FIG. 3, the instruction to erase both the encryption key 14 and the decoding program 15 is output to the information erasing unit 6. However, an instruction to erase only the encryption key 14 or the decoding program 15 may be output. In this case, if it is determined that the encryption key 14 or the decoding program 15 has been erased, the decoding program 15 is terminated to inhibit decoding of the information in the same manner as described above. Therefore, copying of information can be effectively prevented.

Figure 5:
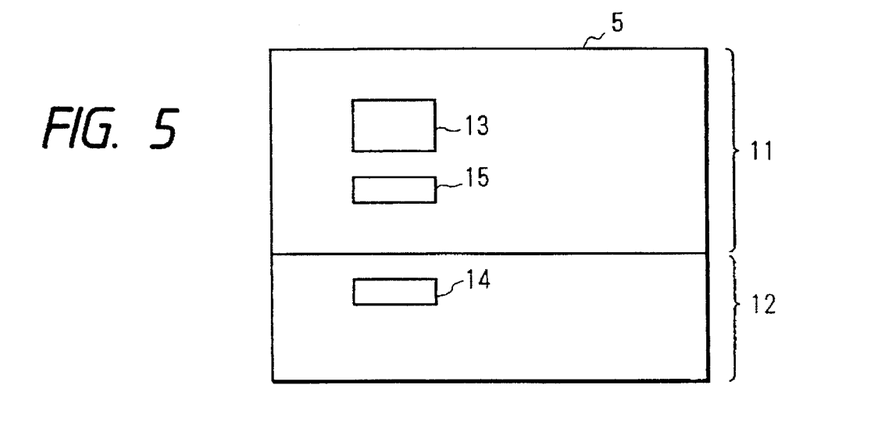
FIG. 5 is a view showing the contents of information recorded on an optical disk in another embodiment of the present invention.
Figure 6:
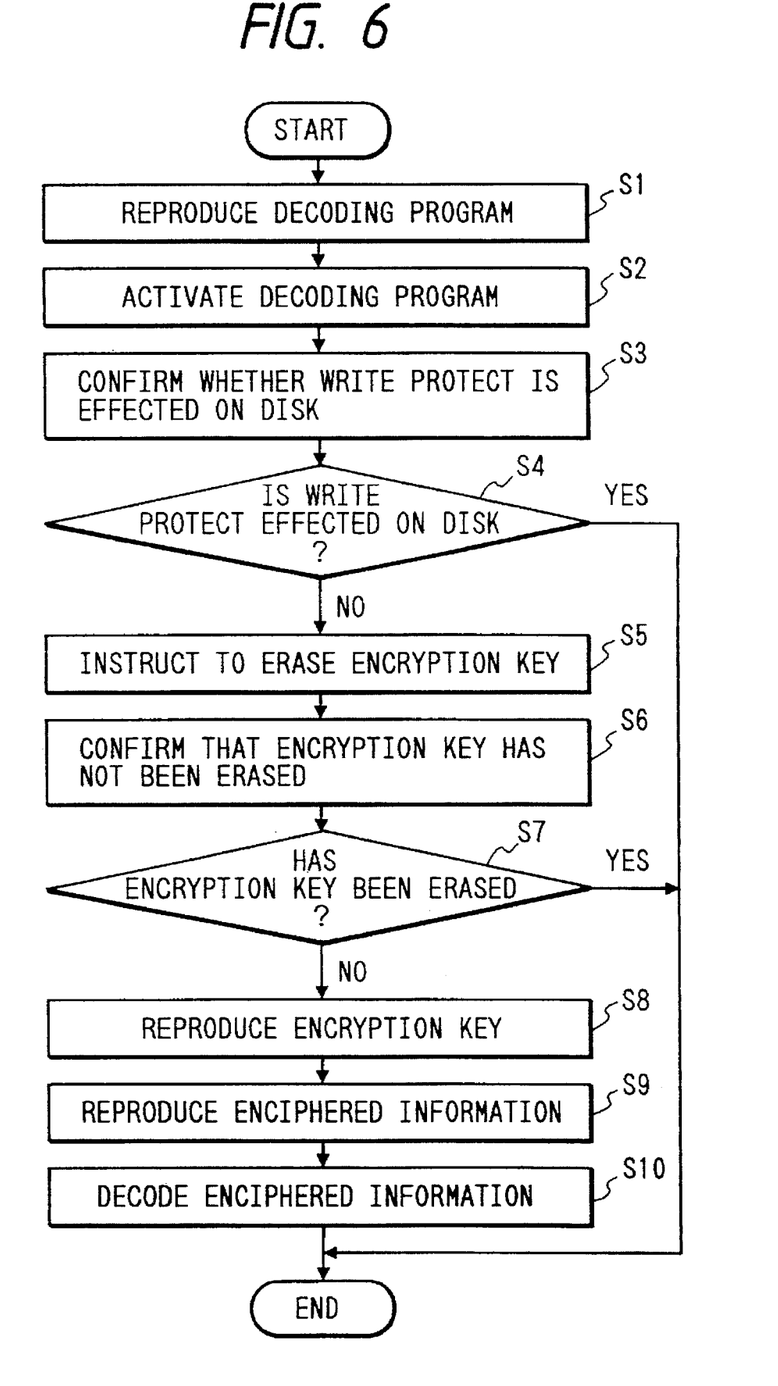
FIG. 6 is a flow chart showing an information reproduction operation of an optical disk in FIG. 5.

Another embodiment of the present invention will be described next. FIG. 5 shows the contents of information recorded on an optical disk used in this embodiment. In this case, enciphered information 13 and a decoding program 15 are recorded on an information recording/reproducing section 11, and only an encryption key 14 is recorded on a ROM section 12. FIG. 6 is a flow chart showing an operation of reproducing the information recorded in this manner. In reproducing information from the optical disk in FIG. 6, first of all, reproduction and activation of the decoding program 15 and confirmation of write protect effected on an optical disk 5 are performed in steps S1 to S4. The processing up to step S4 is the same as that in FIG. 3. If it is confirmed that write protect is not effected on the optical disk 5, an instruction to erase the encryption key 14 is output from a controller 4 to an information erasing unit 6. That is, in this embodiment, since only the encryption key 14 is recorded on the ROM section 12, the instruction to erase only the encryption key 14 is output. As is apparent, this erase instruction is programmed in the decoding program 15.

It is then confirmed that the encryption key 14 has not been erased (step S6). As a result, it is checked whether the encryption key 14 has been erased (step S7). As is apparent, in this case, since the encryption key 14 has been recorded on the ROM section 12, it is determined that the encryption key 14 has not been erased. Therefore, an information reproducing unit 8 reproduces the encryption key 14 in accordance with the instruction from the controller 4 (step S8). The enciphered information 13 is then reproduced (step S9). The enciphered information 13 is sent to an information decoding unit 10. The information decoding unit 10 decodes the enciphered information 13 in accordance with the decoding program 15 (step S10). In this case, if the decoded information is recorded on another optical disk again, the information 13, the encryption key 14, and the decoding program 15 are all recorded on the information recording/ reproducing section 11, as shown in FIG. 4.

When information recorded as shown in FIG. 4 is to be reproduced, a reproducing operation is performed in accordance with the flow chart shown in FIG. 6. In this information reproducing operation, an instruction to erase the encryption key 14 is output in step S5 after steps S1 to S4. In this case, since the encryption key 14 has been recorded on the information recording/reproducing section 11, the encryption key 14 is reliably erased. Since it is determined in step S7 that the encryption key 14 has been erased, the decoding program 15 is terminated at this time, and the reproducing operation is terminated without decoding the enciphered information 13. In the case shown in FIG. 5, the encryption key 14 is stored in the ROM section 12. However, the decoding program 15 may be stored in the ROM section 12 instead of the encryption key 14. In this case, an instruction to erase the decoding program 15 is output in an information reproducing operation. If it is determined that the decoding program 15 has been erased, the decoding program 15 may be terminated.

As described above, in this embodiment as well, an encryption key is recorded on the ROM section of the optical disk, and an instruction to erase the encryption key is output when information is to be reproduced. With this operation, if the information in the optical disk has been copied on another disk, the encryption key is erased, and the decoding program is terminated. Therefore, similar to the above case, decoding of the enciphered information is substantially impossible, and copying of the information recorded on the optical disk can be effectively prevented.

Figure 7:
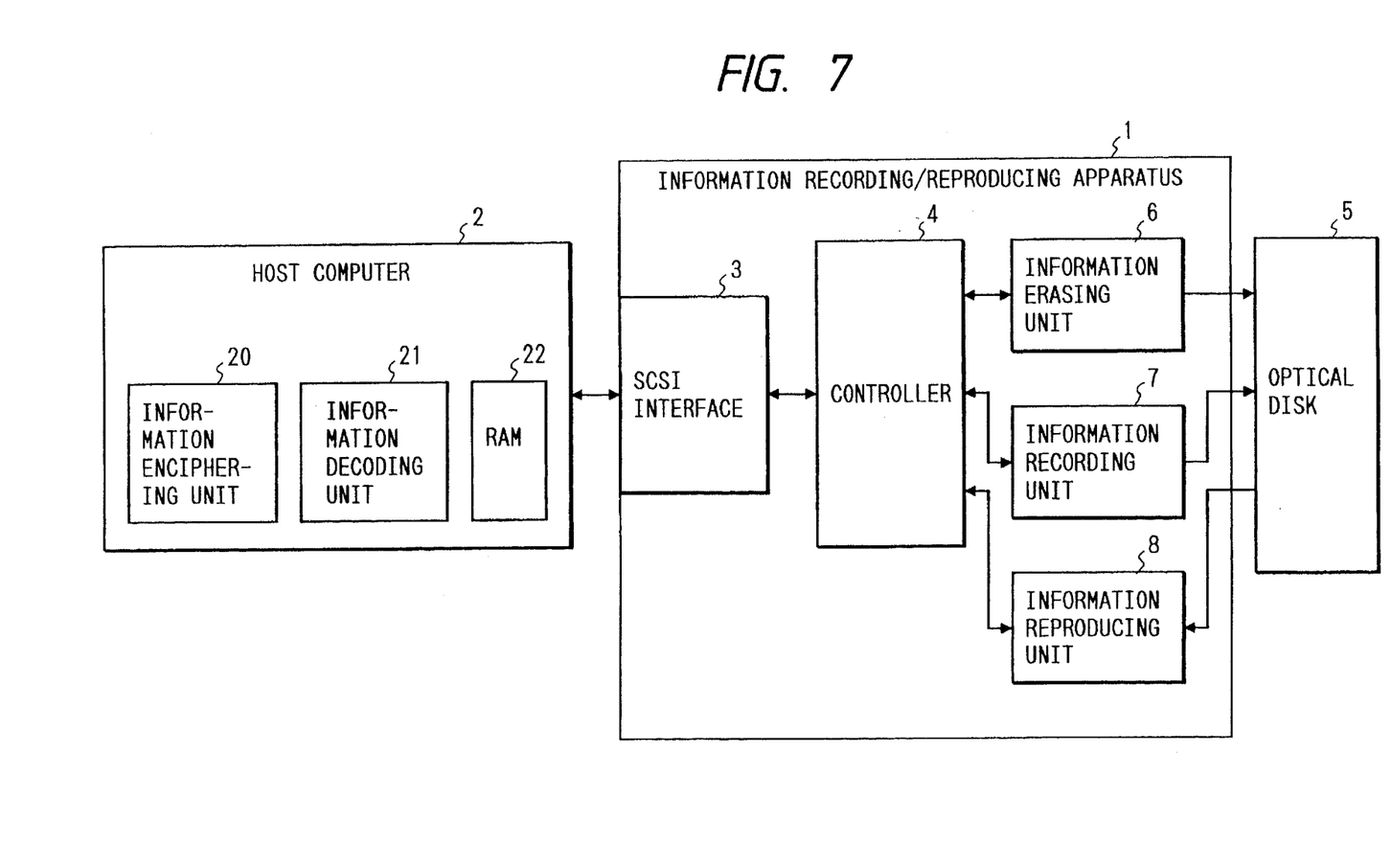
FIG. 7 is a block diagram showing still another embodiment of the present invention.

Still another embodiment of the present invention will be described next. In each embodiment described above, the information decoding unit 10 is arranged in the information recording/reproducing apparatus 1. However, the information decoding unit 10 need not always be arranged in the apparatus but may be arranged in a host computer 2. If the information decoding unit 10 is arranged in the host computer 2, a more flexible system can be configurated. In addition, an information enciphering unit and a decoding unit need not be arranged in each information recording/ reproducing apparatus, and the arrangement of the system can be simplified. FIG. 7 is a block diagram showing such an embodiment. Referring to FIG. 7, the host computer 2 incorporates an information enciphering unit 20 for enciphering information, an information decoding unit 21 for decoding enciphered information, and a RAM 22 for storing a reproduced encryption key 14 and a decoding program 15. The information enciphering unit 20 and the information decoding unit 21 operate in accordance with software and serve to encipher information and decode enciphered information, respectively, in accordance with programs loaded in the RAM 22. Note that enciphering of information and decoding of enciphered information may be performed by means of hardware instead of software. This equally applies to the previous embodiments. The information recording/reproducing apparatus 1 has the same arrangement as that shown in FIG. 1 except that the information decoding unit 10 is not arranged.

In this embodiment, when the host computer 2 instructs the information recording/reproducing apparatus 1 to reproduce information, a controller 4 instructs an information reproducing unit 8 to reproduce the decoding program 15 from a ROM section 12 of an optical disk 5. The reproduced decoding program 15 is transferred from the controller 4 to the host computer 2 via a SCSI interface 3 and stored in the RAM 22. In this manner, the decoding program 15 is stored in the RAM 22 and activated on the host computer 2. Subsequently, similar to the above embodiments, the operation of the apparatus is controlled in accordance with the decoding program 15. That is, an information reproducing operation is performed in accordance with the flow chart shown in FIG. 3 or 6.

In this case, the operation will be described with reference to FIG. 3. Assume, therefore, that the encryption key 14 and the decoding program 15 are recorded on the ROM section 12 of the optical disk 5, as shown in FIG. 2. Referring to FIG. 3, it is checked in steps S3 and S4 whether write protect is effected on the optical disk 5. If write protect is not effected on the optical disk 5, an instruction to erase the encryption key 14 and the decoding program 15 is output (step S5). In this case, since the decoding program 15 is activated in the host computer 2, the erase instruction is sent from the host computer 2 to the controller 4 of the information recording/reproducing apparatus 1. As is apparent, the erase instruction is programmed in the decoding program 15. Upon reception of this erase instruction, the controller 4 instructs an information erasing unit 6 to erase the encryption key 14 and the decoding program 15 which are recorded on the ROM section 12.

Subsequently, it is confirmed that the encryption key 14 and the decoding program 15 have not been erased (step S6). It is checked on the basis of this confirmation result whether the encryption key 14 and the decoding program 15 have been erased (step S7). As is apparent, in this case, since the encryption key 14 and the decoding program 15 are recorded on the ROM section 12, it is determined that they have not been erased. The encryption key 14 is then reproduced (step S8), and the enciphered information is reproduced (step S9). A reproduction instruction for the encryption key 14 and the enciphered information is sent from the host computer 2 to the controller 4. The reproduced encryption key 14 and the enciphered information are transferred to the host computer 2. The encryption key 14 is sent to the RAM 22; and the enciphered information, to the information decoding unit 21. The information decoding unit 21 of the host computer 2 decodes the enciphered information by using the decoding program 15 (step S10). In this case, if the host computer 2 records the reproduced information on another optical disk, the information is recorded in the manner shown in FIG. 4. When reproduced information is to be recorded on another optical disk in this manner, the reproduced information is enciphered by the information enciphering unit 20 according to a predetermined encryption method.

When information recorded as shown in FIG. 4 is to be reproduced, an instruction to erase the encryption key 14 and the decoding program 15 is output in step S5 after reproduction and activation of the decoding program 15 and confirmation of write protect effected on the disk are performed in steps S1 to S4 in FIG. 3. In this case, since the encryption key 14 and the decoding program 15 have been reliably erased, it is determined that they have been erased. At this time, the decoding program 15 is terminated. Even if, therefore, the information decoding unit for decoding enciphered information is arranged on the host computer 2 side, reproduced information can be decoded in the same manner as described above, and an illegitimate copying operation can be prevented.

In each embodiment described above, an optical disk having an information recording/reproducing section and a ROM section is used as a recording medium. However, the present invention can be applied to a disk whose entire surface is constituted by a ROM section. As is apparent, in this case, enciphered information, an encryption key, and a decoding program, the latter two of which are used to decode the information, are recorded on the ROM section. In addition, each embodiment exemplifies the optical disk unit. However, the present invention is not limited to this. For example, the present invention can be applied to an apparatus using a recording medium in the form different from the above medium, e.g., an optical card, or an apparatus for magnetooptically recording/reproducing information, e.g., a magnetooptical disk unit.

As has been described above, according to the present invention, information is enciphered, and at least one of an encryption key and a decoding program, which are used to decode the information, is recorded on the ROM section. When the information is to be reproduced, an instruction to erase at least one of the encryption key and the decoding program is output after the decoding program is reproduced. If the encryption key or the decoding program is erased in accordance with this instruction, the decoding program is terminated. With this operation, when the information in the recording medium has been copied on another medium, the encryption key or the decoding program is erased, and the decoding program is terminated. Therefore, decoding of the enciphered information can be inhibited, and copying of the information can be substantially prevented.

What is claimed is:

1. An information reproducing method comprising the steps of:

reproducing a deciphering program from an information recording medium on which encrypted information is recorded, and an encryption key and the deciphering program, which are used to decipher the information, are recorded as well;

erasing at least one of the encryption key and the deciphering program from the information recording medium in accordance with an instruction from the deciphering program;

confirming whether at least one of the encryption key and the deciphering program has been erased; and terminating activation of the deciphering program when erasure is confirmed in confirming step.

2. An information reproducing apparatus comprising:

means for reproducing encrypted information, an encryption key, and a deciphering program from an information recording medium on which the encrypted information is recorded, and the encryption key and the deciphering program, which are used to decode the information, are recorded as well;

means for deciphering the information in accordance with the reproduced encryption key and deciphering program; and means for erasing designated information from the information recording medium, wherein, when the information is to be reproduced, an instruction to erase at least one of the encryption key and the deciphering program from the information recording medium is output to the information erasing means after the deciphering program is reproduced, and when erasure is confirmed, activation of the deciphering program is terminated.

3. An apparatus according to claim 2, wherein the instruction to erase at least one of the encryption key and the deciphering program is programmed in the deciphering program, and is designated by said information erasing means when the deciphering program is reproduced and activated in an information reproducing operation.

4. An information recording medium on which encrypted information, an encryption key and a deciphering program, which are used to decipher the information, are recorded as well, said information recording medium being used with an information reproducing apparatus, at least a portion of said information recording medium being a ROM portion, and said ROM section storing at least one of the encryption key and the deciphering program, wherein the deciphering program includes at least the steps of:
erasing at least one of the encryption key and the deciphering program;
confirming whether at least one of the encryption key and the deciphering program has been erased; and
terminating activation of the deciphering program when erasure is confirmed in said confirming step.

* * * * *

UNITED STATES PATENT AND TRADEMARK OFFICE
CERTIFICATE OF CORRECTION

PATENT NO. : 5,646,993

DATED : July 8, 1997

INVENTOR(S): TAKAYUKI AIZAWA

It is certified that error appears in the above-identified patent and that said Letters Patent is hereby corrected as shown below:

<u>COLUMN 8</u>

Line 64, "in confirming step." should read
      --in said confirming step.--.

<u>COLUMN 10</u>

Line 8, "portion," should read --section,--.

Signed and Sealed this

Twenty-seventh Day of January, 1998

Attest:

BRUCE LEHMAN

*Attesting Officer*       *Commissioner of Patents and Trademarks*